US005117545A

United States Patent [19]

Di Giusto

[11] Patent Number: 5,117,545

[45] Date of Patent: Jun. 2, 1992

[54] PLANT TO ROLL FLAT PRODUCTS

[75] Inventor: Bruno Di Giusto, Udine, Italy

[73] Assignee: Danieli & C. Officine Meccaniche SpA, Udine, Italy

[21] Appl. No.: 380,602

[22] Filed: Jul. 17, 1989

[30] Foreign Application Priority Data

Jul. 26, 1988 [IT] Italy ........................ 83457 A/88

[51] Int. Cl.[5] ................ B23Q 7/14; B22D 11/126; C21D 9/00; F27B 9/00

[52] U.S. Cl. ........................ 29/33 P; 29/527.7; 148/541; 266/274; 432/128

[58] Field of Search ........................ 29/527.7, 33 P; 432/239, 122, 245, 128; 266/274, 249, 276; 148/155; 414/159; 164/476, 477; 198/776, 774

[56] References Cited

U.S. PATENT DOCUMENTS

| | | | |
|---|---|---|---|
| 4,212,451 | 7/1980 | Klotzbücher et al. | 148/155 X |
| 4,217,095 | 8/1980 | Tokitsu | 432/128 |
| 4,229,878 | 10/1980 | Ushijima | 432/239 X |
| 4,282,048 | 8/1981 | Zentner | 148/155 |
| 4,586,897 | 5/1986 | Weber et al. | 266/276 |
| 4,829,656 | 5/1989 | Rohde | 29/527.7 |

FOREIGN PATENT DOCUMENTS

| | | | |
|---|---|---|---|
| 222521 | 12/1984 | Japan | 266/274 |
| 29412 | 2/1985 | Japan | 266/274 |
| 176402 | 8/1986 | Japan | 29/527.7 |

*Primary Examiner*—William Briggs
*Attorney, Agent, or Firm*—Antonelli, Terry, Stout & Kraus

[57] ABSTRACT

Plant (10) to roll flat products which is fed in line by at least one continuous casting line (11) equipped with a shears (12) upstream of a temperature equalization furnace (13), the outlet of which is in the immediate vicinity of and in cooperation with the intake of a rolling train (10), the temperature equalization furnace (13) comprising within itself three walking beams (22-23-24), of which a first walking beam (22) cooperates with an intake roller conveyor (16) of the temperature equalization furnace (13) and is able to take continuously slabs (18) arriving from the at least one continuous casting line (11) and arranged on the intake roller conveyor (16) and to place them on a second intermediate walking beam (23), which is able to transfer these slabs (18) onto a third walking beam (24), which in turn can transfer the slabs (18) onto an outlet roller conveyor (15).

10 Claims, 2 Drawing Sheets

PLANT TO ROLL FLAT PRODUCTS

This invention concerns a plant to roll flat products. To be more exact, the invention concerns a plant to roll flat products which is fed continuously in line by at least one continuous casting line and is equipped with at least one furnace to equalize the temperature of the flat products.

The article "Reheating furnaces for continuous steelmaking" in the trade journal IRON AND STEEL ENGINEER Vol. 44, No. 9, September 1967, on pages 119-126 describes many possible ways of carrying out continuous casting. Among these ways it describes a plant in which products such as blooms, billets or slabs coming from a plurality of continuous casting lines are aligned and fed into a reheating furnace, in which these products are arranged one after another and then feed the rolling train.

This article describes also, with regard to FIG. 9, an imaginary plant which is acknowledged to be non-existent and is equipped with a plurality of reheating furnaces.

The article "Brammenwarmeinsatz und Direktwalzung" in the trade journal STAHL UND EISEN, VOL. 104, NO. 22, 29/10/84, on pages 59-63 describes a rolling plant equipped with a device able to heat the edges of slabs to be rolled.

JP-A-58-6701 discloses a rolling plant in which the products coming from two continuous casting lines can proceed in a heating device. A conveyor table located between the casting lines and the heating device enables the slabs to be introduced or not introduced into the heating device as required.

JP-A-57-121808 discloses a plant equipped with a plurality of continuous casting lines. The products coming from these lines are introduced into a transfer installation which arranges to align the products, which are passed thereafter through a heating device.

JP-A-57-121806 and JP-A-54-153750 disclose a device that transfers slabs coming from a plurality of continuous casting lines and is equipped with a trolley able to align the slabs on one single line that feeds a rolling train.

JP-A-59-30401 discloses a device to reheat products coming from a continuous casting line, whereby the products are taken one by one by a trolley and conveyed thereafter into a heat maintenance furnace, a fast cooling chamber, a slow cooling chamber and a heat maintenance chamber before being taken by another trolley which cooperates with the feed line of a rolling train.

U.S. Pat. No. 3,648,359 discloses a plant to roll products coming from a plurality of continuous casting lines, whereby the products are aligned on a transfer conveyor table with the intake of a reheating furnace the outlet of which feeds a rolling train.

Moreover, rolling plants are known which are fed by a plurality of continuous casting lines and which include immediately downstream of the casting lines a heated tunnel, at the end of which is a traversing device that feeds a temperature equalization furnace which is connected directly to a rolling line.

These systems entail the shortcomings of taking up a great deal of space, requiring many machines and involving considerable maintenance work. Moreover, these known embodiments have the drawback of leading to a great waste of energy.

The invention has the purpose of obviating the typical shortcomings of the state of the art.

This purpose is achieved with a plant having the features described in the main claim, while the dependent claims illustrate preferred forms of embodiment of the invention.

According to a first aspect of the invention a temperature equalization furnace with its own roller conveyor is included, for each continuous casting line, immediately downstream of the continuous casting lines, which are advantageously but not necessarily two continuous casting lines, each of which is served by a shears.

A measurement system able to read the length of the slab entering the furnace is provided advantageously in cooperation with the inlet of the equalization furnace. This measurement system is enabled to actuate the shears located at the furnace inlet to perform the shearing when the length of the slab has reached a required value of length and/or weight.

According to this aspect of the invention, when the slab has been sheared to size, it is accelerated within the equalization furnace by variable-speed powered rollers included in the furnace. This acceleration serves to distance the tail of the sheared slab from the head of the following slab.

The length of the equalization furnace is normally dimensioned so as to hold one slab sheared to size.

The rollers in the equalization furnace are powered and cooled and may be capable of a swinging movement to the right and left which enables the slabs to stay on the rollers during the equalization step without an unfavourable effect on the rollers at work or on the slabs by creating cold points thereon, for instance.

According to the invention as suitable for employment in rolling trains fed by one or more continuous casting lines, the slab coming from a continuous casting line is firstly sheared and then introduced into a temperature equalization furnace.

This equalization furnace comprises three series of walking beams consisting of movable grid elements. The inclusion of three series of walking beams arises from the desire not to cause obstacles or untimely stoppages for slabs coming from a continuous casting line and intended for rolling.

According to the invention the first series of grid elements takes the slabs continuously from the intake roller conveyor and places them on a second series of grid elements so as to free quickly the roller conveyor, which can thus receive the successive slabs without any problems.

According to a preferred form of embodiment of the invention the second series of movable grid elements can move independently of the first and third series of grid elements and is dimensioned so as to be able to store in the direction of its width a number of slabs corresponding to the capacity of liquid steel held in the ladle. This enables the whole output of the continuous casting plant to be held if any difficulties occur in the rolling mill positioned downstream.

During normal working the second series of movable grid elements supports each slab only for the time required for proper equalization of the temperature of the slab with the required rolling temperature.

According to a preferred form of embodiment of the invention the second series of grid elements has a configuration forming an angle to the direction of feed of the slab in the furnace so as to change continuously the area of contact between a grid element and the slab during the movement of the latter.

The third series of grid elements conveys the slab with its temperature already equalized towards the outlet roller conveyor.

According to the invention the outlet roller conveyor may carry out a to-and-fro movement to prevent prolonged contact between the same zones of the slab and roller and to avoid bending of the roller under load.

The outlet roller conveyor cooperates also with an upstream emergency outlet from the furnace.

According to a further form of embodiment of the invention such a conformation is employed together with two or more continuous casting lines. In this case a first temperature equalization furnace for the slabs is provided, the outlet of which feeds a second furnace that maintains the temperature of the slabs and feeds a rolling train.

Other purposes and advantages of the invention will be made clear on reading the following description of some embodiments of the invention, which are given as a non-restrictive example, with the help of the attached figures, in which.

Figure 1:
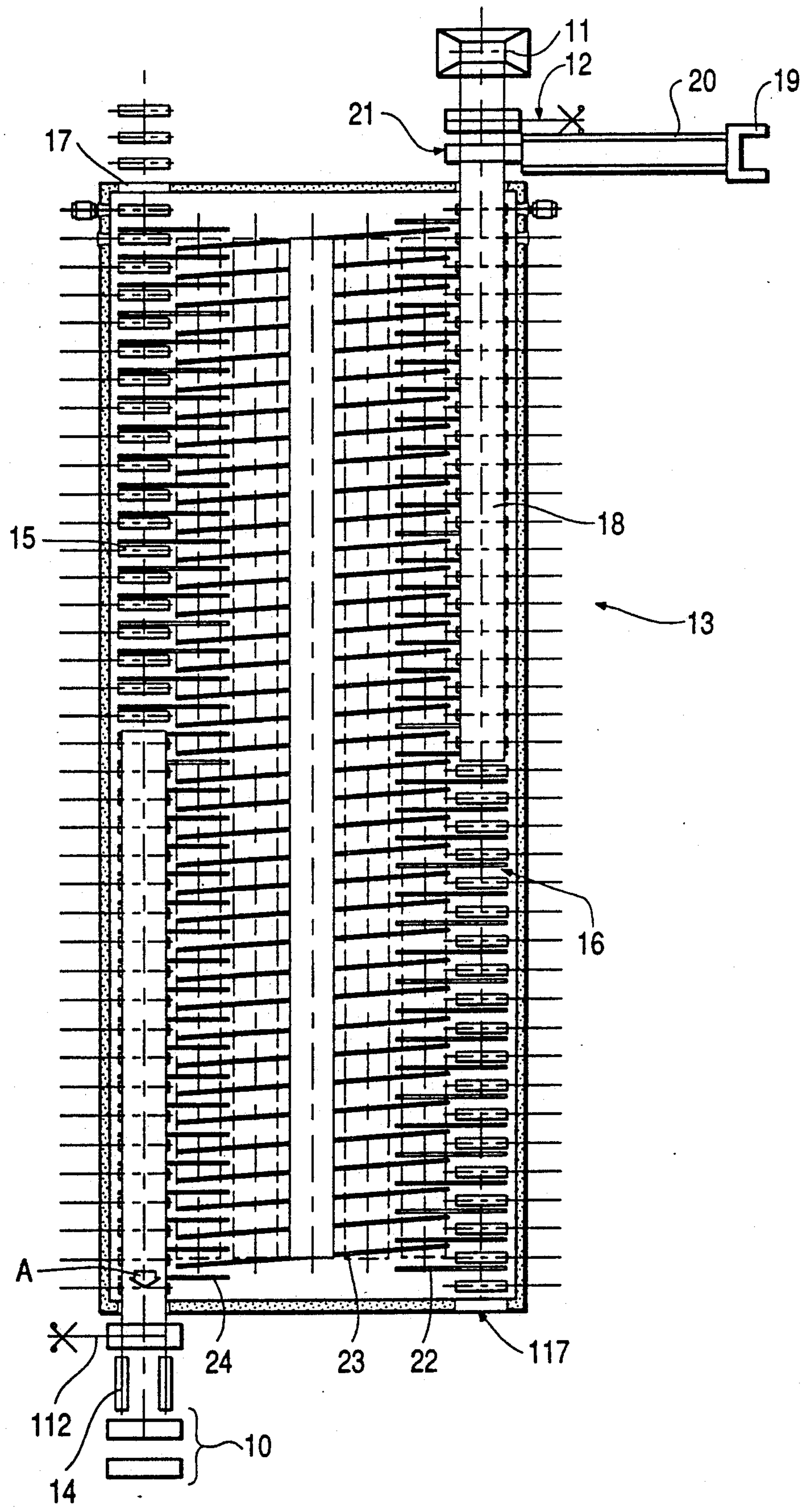
FIG. 1 shows a plant according to a first and a second form of embodiment of the invention.

In FIG. 1 a rolling plant 10 is fed by a continuous casting line 11, which comprises a first shears 12 and, in line, a roller conveyor 16 enclosed in a temperature equalization furnace 13.

In the example shown a traversing and discharge system is located between the first shears 12 and the equalization furnace 13 and consists of a lateral traversing means 21, a cooling traversing means 20 and a stacker 19.

This traversing system has the purpose that, if any blockage takes place downstream of the continuous casting line 11 and the casting line 11 has to continue the casting, the first shears 12 crops the cast slab 18 to the required length and the slabs thus cropped are discharged along this lateral discharge system.

When the cast slab entering the equalization furnace 13 reaches its required length, it is sheared by the shears 12, and the slab thus sheared is fed onwards and kept within the equalization furnace 13.

The rollers of the roller conveyor 16 are powered and cooled.

According to a variant the rollers of the roller conveyor 16 are able to perform a swinging movement of alternate rotation to the right and to the left, which induces in the slab 18 a to-and-fro movement during the whole time required for the slab 18, stored on the roller conveyor 16 in the equalization furnace 13, to have its temperature fully equalized in all its parts.

An inspection and emergency exit door 117 may be included downstream of the roller conveyor 16.

A second shears 112 is included at the outlet at the downstream end of the furnace 13; downstream of the second shears 112 and between the same and the rolling train 10 there may be included a heater 14 to heat the edges of the slab 18 before the latter reaches the rolling train.

The plant of FIG. 1 comprises an intake roller conveyor 16, which receives slabs 18 coming from a continuous casting line 11; these slabs 18 are sheared to size by the first shears 12 and are accelerated within the temperature equalization furnace 13 by the powered intake roller conveyor 16.

Three independent series of walking beams, 22-23-24 respectively, are included within the furnace 13 and consist of series of grid elements which are alternately stationary and movable.

The grid elements belonging to the first walking beam 22 have the task of taking the slabs 18 from the intake roller conveyor 16 and placing them on the second walking beam 23

According to the invention the second walking beam 23 is wide enough to be able to bear a number of slabs such that the weight of that number corresponds to the weight of the liquid steel held in the ladle.

In this way a stay zone is created where the slabs 18 can be stored in the event of difficulties in the rolling train 10 or in other components of the plant.

According to a preferred form of embodiment of the invention the grid elements belonging to the second walking beam 23 are inclined at a pre-set angle to the direction of feed of the slabs 18 in the furnace 13.

This enables the area of contact between a grid element and a slab 18 to be changed continuously during the movement of feed.

The second walking beam 23 feeds a third walking beam 24 having the task of conveying the slabs 18 onto an outlet roller conveyor 15 which feeds the rolling train 10 in the direction shown by the arrow A.

The outlet roller conveyor 15 is provided with an emergency exit 17 located at the upstream end of the furnace 13.

Figure 2:
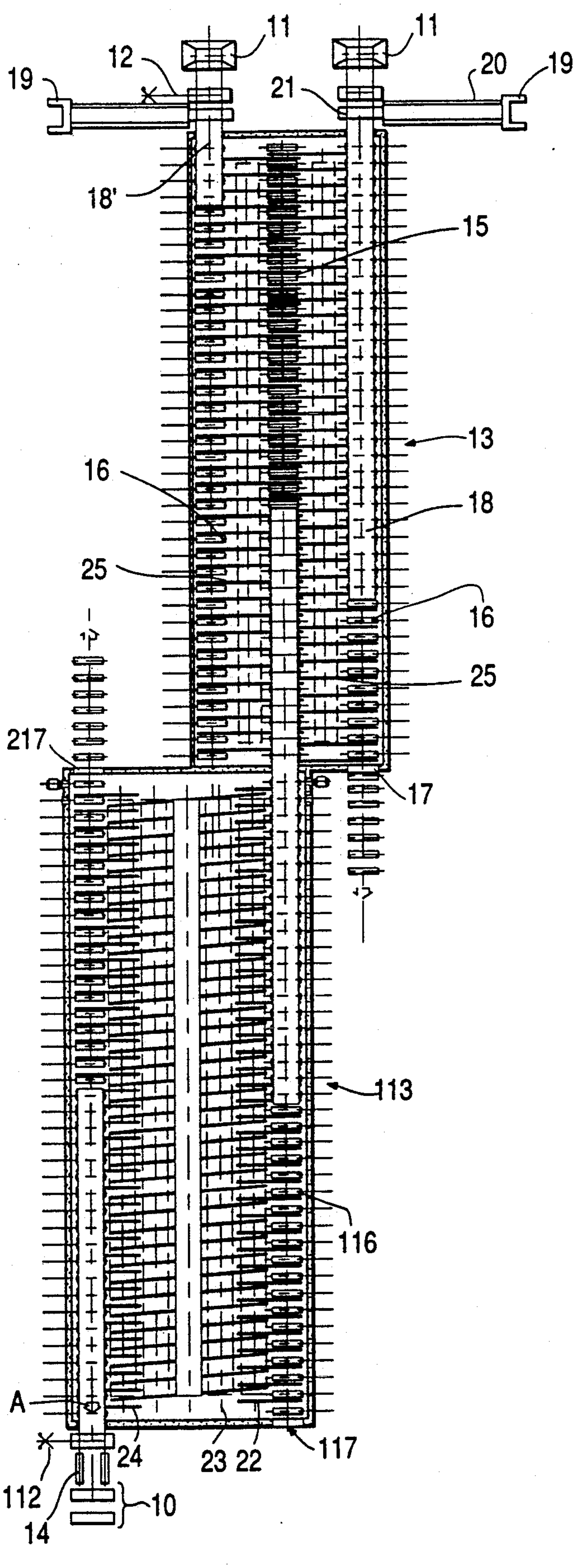
FIG. 2 shows a plant according to a third form of embodiment of the invention.

FIG. 2 shows an embodiment analogous to that of FIG. 1, wherein a temperature maintenance and heating furnace 113 to feed the rolling train 10 is fed itself by a temperature equalization furnace 13, the inlets of which receive slabs 18—18' from two continuous casting lines 11.

The equalization furnace 13 comprises a central roller conveyor 15 which during the course of its development becomes the roller conveyor 116 that feeds the temperature maintenance and heating furnace 113.

Between the central roller conveyor 15 and two lateral intake roller conveyors 16 are located traversing elements 25.

The temperature equalization furnace 13 performs the task of aligning the slabs 18—18' in relation to the inlet of the temperature maintenance furnace 113 and is provided with a downstream emergency exit 17.

The walking beam elements 22-23-24 of the temperature maintenance and heating furnace 113 are analogous to those described regarding FIG. 1.

The temperature maintenance and heating furnace 113 too includes an upstream emergency exit 217 and a downstream inspection and emergency door 117.

The equalization furnace 13 comprises two series of traversing elements to traverse the slabs 18 from the lateral intake roller conveyors 16 to the central roller conveyor 15.

I claim:

1. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself at least three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which is able to transfer these slabs onto a third walking beam, which in turn can transfer the slabs onto an outlet roller conveyor, further comprising lateral discharge means for discharging slabs from said continuous casting line, said lateral discharge means being provided between said shears and said temperature equalization furnace whereby said slabs can be discharged before entering said temperature equalization furnace in case of a blockage downstream of said at least one continuous casting line.

2. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself at least three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which is able to transfer these slabs onto a third walking beam, which in turn can transfer the slabs onto an outlet roller conveyor, wherein said temperature equalization furnace has first and second opposing ends, the first opposing end being located adjacent said at least one continuous casting line and the second opposing end being located adjacent said rolling train, further comprising an emergency exit from the temperature equalization furnace which cooperates with said outlet roller conveyor at said first opposing end.

3. A plant to roll flat products comprising:

at least one continuous casting line including shears to crop the length of a casting to form a slab having a predetermined size;

a temperature equalization furnace provided downstream of said at least one continuous casting line and having at least one inlet cooperating with said at least one continuous casting line to accept said slabs therefrom, said temperature equalization furnace further including at least one intake roller conveyor cooperating with said at least one inlet, an outlet outer conveyor and a transfer device for transferring said slabs from said at least one inlet roller conveyor to said outlet conveyor;

a temperature maintenance and heating furnace provided downstream of said temperature equalization furnace and having a roller conveyor cooperating with said outlet conveyor of said temperature equalization furnace for feeding slabs from said temperature equalization furnace to said temperature maintenance and heating furnace, and outlet roller conveyor and at least first, second and third walking beams, the first walking beam cooperating with said roller conveyor of the temperature maintenance and heating furnace and being able to take continuously slabs therefrom and place said slabs on said second walking beams which is able to take said slabs therefrom and place said slabs onto said third walking beam which is able to take said slabs therefrom and place said slabs on said outlet roller conveyor; and a roller train having an intake cooperating with said outlet roller conveyor of said temperature maintenance and heating furnace.

4. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself at least three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which is able to transfer these slabs onto a third walking beam, which in turn can transfer the slabs onto an outlet roller conveyor, wherein the three walking beams comprise grid elements arranged parallel to each other, the grid elements being alternately stationary and movable; and in which the grid elements belonging to the second walking beam are positioned at a pre-set oblique angle to the direction of feed of the slabs in the equalization furnace.

5. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which in turn can transfer the slabs onto an outlet roller conveyor, wherein the outlet roller conveyor cooperates with an emergency exit from the temperature equalization furnace.

6. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself at least three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which is able to transfer these slabs onto a third walking beam, which in turn can transfer the slabs onto an outlet roller conveyor, in which the width of the second walking beam is enough to be able to bear a number of slabs having a weight corresponding to that of the whole quantity of liquid steel held in the ladle feeding the at least one continuous casting line.

7. Plant as claimed in claim 3, in which the temperature equalization furnace has at least two inlets cooperating with at least two continuous casting lines.

8. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself at least three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which is able to transfer these slabs onto a third walking beam, which in turn can transfer the slabs onto an outlet roller conveyor, wherein said temperature equalization furnace has first and second opposing ends, the first opposing end being located adjacent said at least one continuous casting line and the second opposing end being located adjacent said rolling train, further comprising an emergency exit rom said temperature equalization furnace which cooperates with said intake roller conveyor at said second opposing end.

9. Plant as claimed in claim 7, in which the transfer device comprises a plurality of grid elements which are alternately stationary and movable.

10. Plant to roll flat products which is fed in line by at least one continuous casting line equipped with a shears upstream of a temperature equalization furnace, the outlet of which is in the immediate vicinity of and in cooperation with the intake of a rolling train, the plant being characterized in that the temperature equalization furnace comprises within itself three walking beams, of which a first walking beam cooperates with an intake roller conveyor of the temperature equalization furnace and is able to take continuously slabs arriving from the at least one continuous casting line and arranged on the intake roller conveyor and to place them on a second intermediate walking beam, which in turn can transfer the slabs onto an outlet roller conveyor wherein temperature maintenance and heating furnace is provided with an emergency exit.

* * * * *